(12) United States Patent
Hotta et al.

(10) Patent No.: US 10,883,444 B2
(45) Date of Patent: Jan. 5, 2021

(54) INTERNAL COMBUSTION ENGINE

(71) Applicant: TOYOTA JIDOSHA KABUSHIKI KAISHA, Toyota (JP)

(72) Inventors: Shintaro Hotta, Susono (JP); Susumu Hashimoto, Ebina (JP); Shinji Sadakane, Susono (JP); Hiroshi Tada, Mishima (JP); Fumio Takamiya, Gotemba (JP); Akira Hojo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/433,153

(22) Filed: Jun. 6, 2019

(65) Prior Publication Data

US 2019/0383230 A1 Dec. 19, 2019

(30) Foreign Application Priority Data

Jun. 15, 2018 (JP) .................................. 2018-114891

(51) Int. Cl.
*F02F 3/26* (2006.01)
*F02B 75/22* (2006.01)
(Continued)

(52) U.S. Cl.
CPC ................ *F02F 3/26* (2013.01); *F02B 75/22* (2013.01); *F02B 2075/1824* (2013.01); *F16H 57/025* (2013.01); *F16H 2057/0203* (2013.01)

(58) Field of Classification Search
CPC ..... F02F 3/26; F02B 75/22; F02B 8075/1824; F16H 57/025; F16H 2057/0203
(Continued)

(56) References Cited

U.S. PATENT DOCUMENTS 7,168,396 B1 * 1/2007 Bulicz ................ F02D 13/0234
123/27 R
2002/0189583 A1 * 12/2002 Inoue .................... F02F 1/4214
123/301
(Continued)

FOREIGN PATENT DOCUMENTS

JP  H07-058059 B2  6/1995
JP  2017-096245 A  6/2017

*Primary Examiner* — Joseph J Dallo
*Assistant Examiner* — Yi-Kai Wang
(74) *Attorney, Agent, or Firm* — Oliff PLC

(57) ABSTRACT

An internal combustion engine has a plurality of cylinders and transmission arranged adjoining the engine. If designating an average height of a combustion chamber in a region inside from a virtual cylindrical surface passing through center of a valve body of an intake valve and extending in a circumferential direction of each cylinder when a piston is at top dead center, as "center height", and designating average of a height of the combustion chamber in a region outside from the virtual cylindrical surface when the piston is at top dead center, as "peripheral height", the combustion chambers form a center height of a transmission side cylinder positioned most to the transmission side among the plurality of cylinders is higher than center heights of usual cylinders including one cylinder other than the transmission side cylinder and a peripheral height at the transmission side cylinder lower than peripheral heights of usual cylinders.

7 Claims, 11 Drawing Sheets

(51) Int. Cl.
   *F02B 75/18*     (2006.01)
   *F16H 57/025*    (2012.01)
   *F16H 57/02*     (2012.01)

(58) Field of Classification Search
   USPC .......................................... 123/52.1
   See application file for complete search history.

(56) References Cited

U.S. PATENT DOCUMENTS

2016/0169185 A1* 6/2016 Iwasaki ............... F02M 26/52
                                                  123/305
   2016/0363081 A1  12/2016 Osaka et al.

* cited by examiner

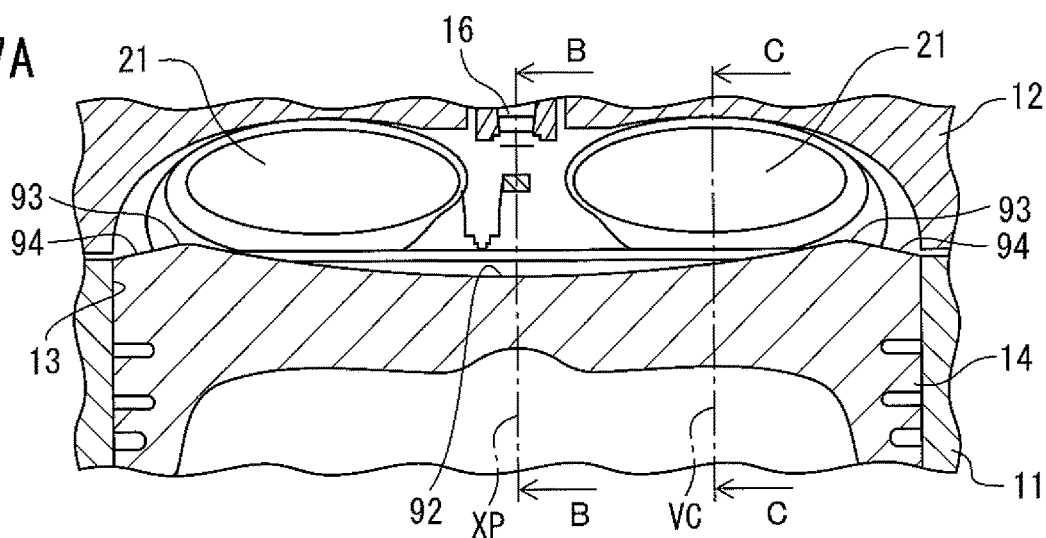
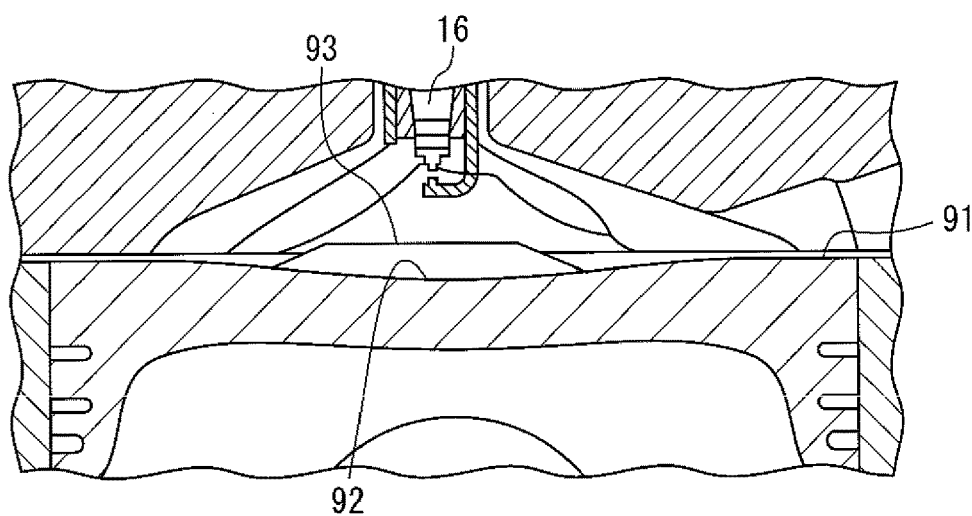
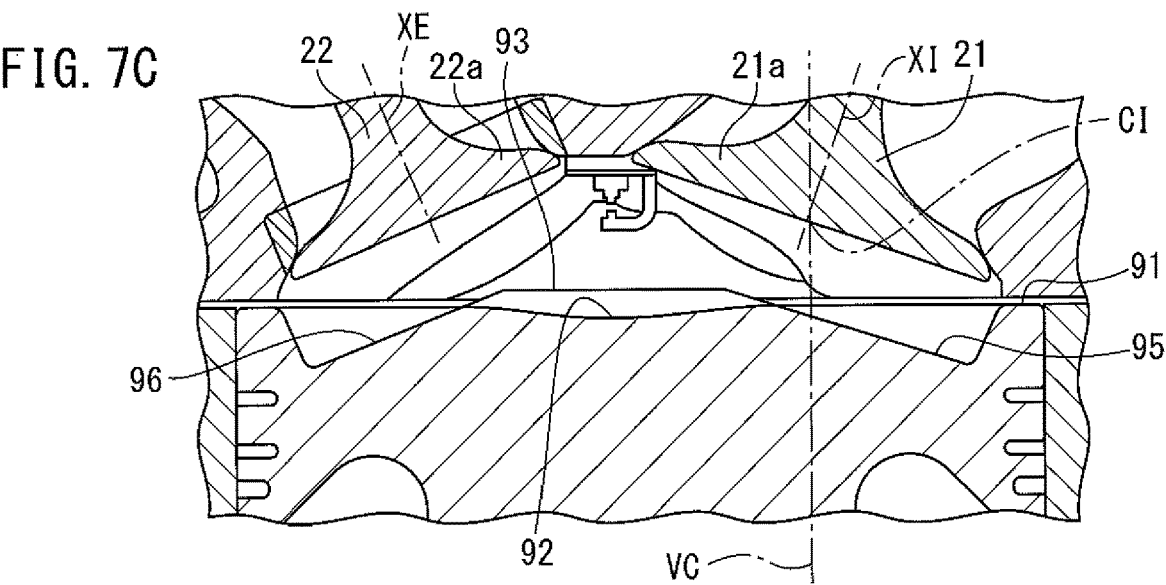

INTERNAL COMBUSTION ENGINE

FIELD

The present invention relates to an internal combustion engine.

BACKGROUND

In the past, various techniques have been studied for reducing the noise generated during operation of an internal combustion engine (for example, PTLs 1, 2). One type of noise generated during operation of an internal combustion engine is the large vibrating noise which occurs along with the large surface vibration at a flywheel, which occurs due to the large vibrating force arising from combustion at the cylinders closest to the flywheel. In PTL 1 proposes, in order to reduce such vibrating noise, to retard the ignition timings of the cylinders closest to the flywheel to reduce the vibrating force arising from combustion, and as a result reduce the vibrating noise.

CITATION LIST

Patent Literature

[PTL 1] Japanese Examined Patent Publication No. 7-058059
[PTL 2] Japanese Unexamined Patent Publication No. 2017-096245

SUMMARY

Technical Problem

In this regard, in PTL 1, the ignition timings at the flywheel side cylinders are retarded so as to reduce the vibrating force arising from combustion at the flywheel side cylinders and reduce the vibrating noise. If retarding the ignition timing, it is possible to reduce the vibrating force arising from combustion at the flywheel side cylinders, but the efficiency of conversion of combustion energy to kinetic energy is decreased, and therefore the fuel efficiency is deteriorated.

The present invention was made in consideration of the above problem and has as its object to provide an internal combustion engine able to reduce the noise generated during operation of the internal combustion engine while keeping the fuel efficiency from deteriorating.

Solution to Problem

The present invention was made so as to solve the above problem and has as its gist the following.

(1) An internal combustion engine having a plurality of cylinders and with a power train component other than the internal combustion engine arranged adjoining it, wherein
  if designating an average of a height of a combustion chamber in a region inside from a virtual cylindrical surface passing through a center of a valve body of an intake valve and extending in a circumferential direction of each cylinder when a piston is at top dead center, as a "center height", and designating an average of a height of the combustion chamber in a region outside from the virtual cylindrical surface when the piston is at top dead center, as a "peripheral height", the combustion chambers are formed so that a center height of a component side cylinder positioned the most to the power train component side among the plurality of cylinders is higher than center heights of usual cylinders including at least one cylinder other than the component side cylinder and a peripheral height at the component side cylinder is lower than peripheral heights of the usual cylinders.

(2) The internal combustion engine according to above (1), wherein the usual cylinders include a cylinder positioned separated the most from the power train component.

(3) The internal combustion engine according to above (2), wherein the combustion chambers are formed so that the center height at the cylinder at the power train component side of two adjoining cylinders, is equal to or greater than the center height at the cylinder at the opposite side from the power train component side, and so that the peripheral height at the cylinder of the power train component side of two adjoining cylinders, is equal to or less than the peripheral height at the cylinder at the opposite side from the power train component side.

(4) The internal combustion engine according to any one of above (1) to (3), wherein
  the combustion chamber is at least partially defined by a cylinder head and the piston, and
  a shape of a part of the cylinder head defining each combustion chamber is the same regardless of the center height and the peripheral height, and the shape of the piston defining each combustion chamber is a shape differing according to the center height and the peripheral height.

(5) The internal combustion engine according to above (4), wherein
  the piston comprises a groove at a center part of its top surface in a cross-section passing through a center of the piston and extending in a direction in which the plurality of cylinders are arranged, and
  the piston is formed so that an average depth of the groove of the piston is deeper in a cylinder with a relatively high center height compared with a cylinder with a relatively low center height.

(6) The internal combustion engine according to above (5), wherein the groove of the piston is formed to be deepest at the center of the piston and to become gradually shallower toward the outside of the piston in the radial direction, and is formed so that the depth of the groove at the center of the piston is deeper in a cylinder with a relatively high center height compared with a cylinder with a relatively low center height.

(7) The internal combustion engine according to above (5) or (6), wherein the piston comprises slanted portions with top surfaces slanting to the crankshaft side toward the outsides in the radial direction at the outside of the groove.

Advantageous Effect of Invention

According to the present invention, there is provided an internal combustion engine able to reduce the noise generated during operation of the internal combustion engine while keeping the fuel efficiency from deteriorating.

BRIEF DESCRIPTION OF DRAWINGS

FIGS. 7A-7C are cross-sectional views of a top part of a cylinder (near cylinder head) in a usual cylinder.

DESCRIPTION OF EMBODIMENT

Figure 1:
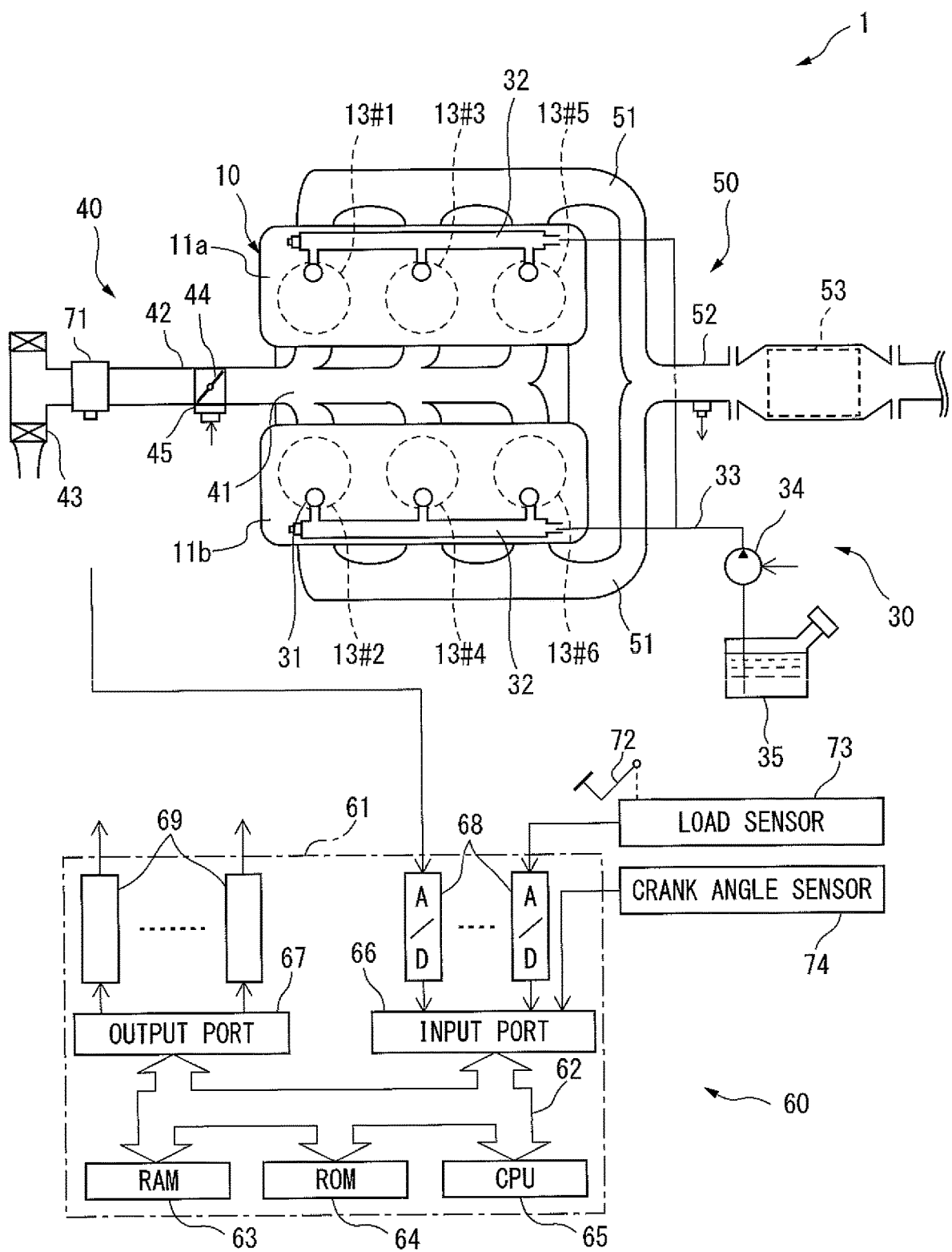
FIG. 1 is a view schematically showing configuration of an internal combustion engine.

Below, referring to the drawings, embodiments of the present invention will be explained in detail. Note that, in the following explanation, similar components are assigned the same reference numerals. Note that, in the present specification, an upper direction denotes a direction from a crank shaft toward a cylinder head, while a lower direction denotes a converse direction. However, the mounting direction of an internal combustion engine is not necessarily limited in this direction.

Construction of Internal Combustion Engine

Figure 2:
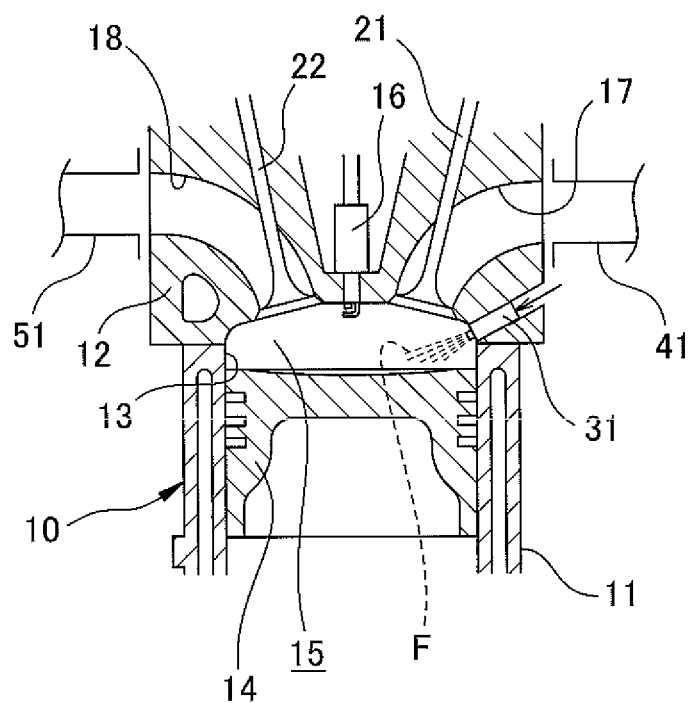
FIG. 2 is a schematic cross-sectional view of an engine body of an internal combustion engine around one cylinder thereof.

First, referring to FIGS. 1 to 3, the configuration of an internal combustion engine 1 according to the first embodiment will be explained. FIG. 2 is a schematic cross-sectional view of an engine body 10 of the internal combustion engine 1 around one cylinder thereof. As shown in FIG. 1, the internal combustion engine 1 is provided with an engine body 10, fuel feed system 30, intake system 40, exhaust system 50, EGR mechanism 60, evaporated fuel purge device 90, and control device 60.

In the present embodiment, the internal combustion engine 1 is V-six, and the engine body 10 is provided with a cylinder block 11 in which a plurality of banks 11a, 11b are formed, and cylinder heads 12 provided on the banks 11a, 11b. In each bank 11a, 11b, three cylinder 12 are formed. In each cylinder 13, a piston 14 is arranged to reciprocate in the cylinder 13. In the cylinder 13 between the piston 14 and the cylinder head 12, a combustion chamber 15, in which an air-fuel mixture is burned, is formed. Therefore, the combustion chamber 15 id defined by the piston 14, cylinder head 12 and cylinder 13. The cylinder head 12 is provided with, near the center of each cylinder 13, a spark plug 16 for igniting the air-fuel mixture in the combustion chamber 15.

Note that, although the internal combustion engine 1 according to the present embodiment is V-six, it may be an in-line cylinder engine or horizontally opposed engine, and may be a three cylinder engine, four cylinder engine, eight cylinder engine, ten cylinder engine, or an engine having other number of cylinders.

The cylinder head 12 is formed with intake ports 17 and exhaust ports 18. These intake ports 17 and exhaust ports 18 are communicated with the combustion chambers 15 of the cylinders 13. Between each combustion chamber 15 and intake port 17, an intake valve 21 is arranged. This intake valve 21 opens and closes the intake port 17. Similarly, between each combustion chamber 15 and exhaust port 18, an exhaust valve 22 is arranged. This exhaust valve 22 opens and closes the exhaust port 18. The valve bodies of the intake valves 21 and the exhaust valves 22 define the combustion chamber 15.

The fuel feed system 30 comprises fuel injectors 31, a delivery pipe 32, fuel feed pipe 33, fuel pump 34, and fuel tank 35. Each fuel injector 31 is arranged in the cylinder head 12 so as to directly inject fuel into each cylinder 13. Fuel pumped out by the fuel pump 34 is supplied through the fuel feed pipe 33 to the delivery pipe 32 and injected from the fuel injectors 31 into the cylinders 13.

The intake system 40 is provided with intake manifold 41, intake pipe 42, air cleaner 43, and throttle valve 44. The intake ports 17 of the cylinders 13 are communicated with the intake pipe 43 through the intake manifold 41 and the intake pipe 42. The throttle valve 46 is arranged in the intake pipe 42 and operated so as to be opened and closed by the throttle valve drive actuator 45. Note that, the intake ports 17, the intake manifold 41, and the intake pipe 42 form an intake passage.

The exhaust system 50 is provided with an exhaust manifold 51, exhaust pipe 52, exhaust purification catalyst 53. The exhaust ports 18 of the cylinders 13 are communicated with the exhaust purification catalyst 53 through the exhaust manifold 51 and exhaust pipe 52. The exhaust purification catalyst 53 is, for example, a three-way catalyst, NOx storage reduction catalyst, and purifies components in the exhaust gas, such as NOx or unburned HC. The exhaust port 18, the exhaust manifold 51, the exhaust pipe 52 and the exhaust purification catalyst 53 form an exhaust passage.

The control system 60 is provided with an electronic control unit (ECU) 61. The ECU 61 includes a RAM (random access memory) 63, ROM (read only memory) 64, CPU (microprocessor) 65, input port 66, and output port 67, which are connected with each other through a bidirectional bus 62.

The intake pipe 42 is provided with a flow rate sensor (for example, an air flow meter) 71 for detecting a flow rate of intake gas flowing through the intake pipe 42. The output of the flow rate sensor 71 is input to the input port 66 through corresponding AD converter 68. Further, the accelerator pedal 72 is connected to a load sensor 73 generating an output voltage proportional to an amount of depression of the accelerator pedal 72. The output voltage of the load sensor 73 is input to the input port 66 through a corresponding AD converter 68. The crank angle sensor 74 generates an output pulse every time the crankshaft 23 of the engine body 10 rotates, for example, by 10 degrees. This output pulse is input to the input port 66. In the CPU 65, the engine rotational speed is calculated from these output pulses.

On the other hand, the output port 67 of the ECU 61 is connected to actuators controlling the operation of the internal combustion engine 1 through the corresponding drive circuits 69. In the example shown in FIG. 1, the output port 67 is connected to the fuel injectors 31, fuel pump 34, and throttle valve drive actuator 45. The ECU 61 outputs control signals for controlling these actuators from the output port 67 to control the operation of the internal combustion engine 1.

Figure 3:
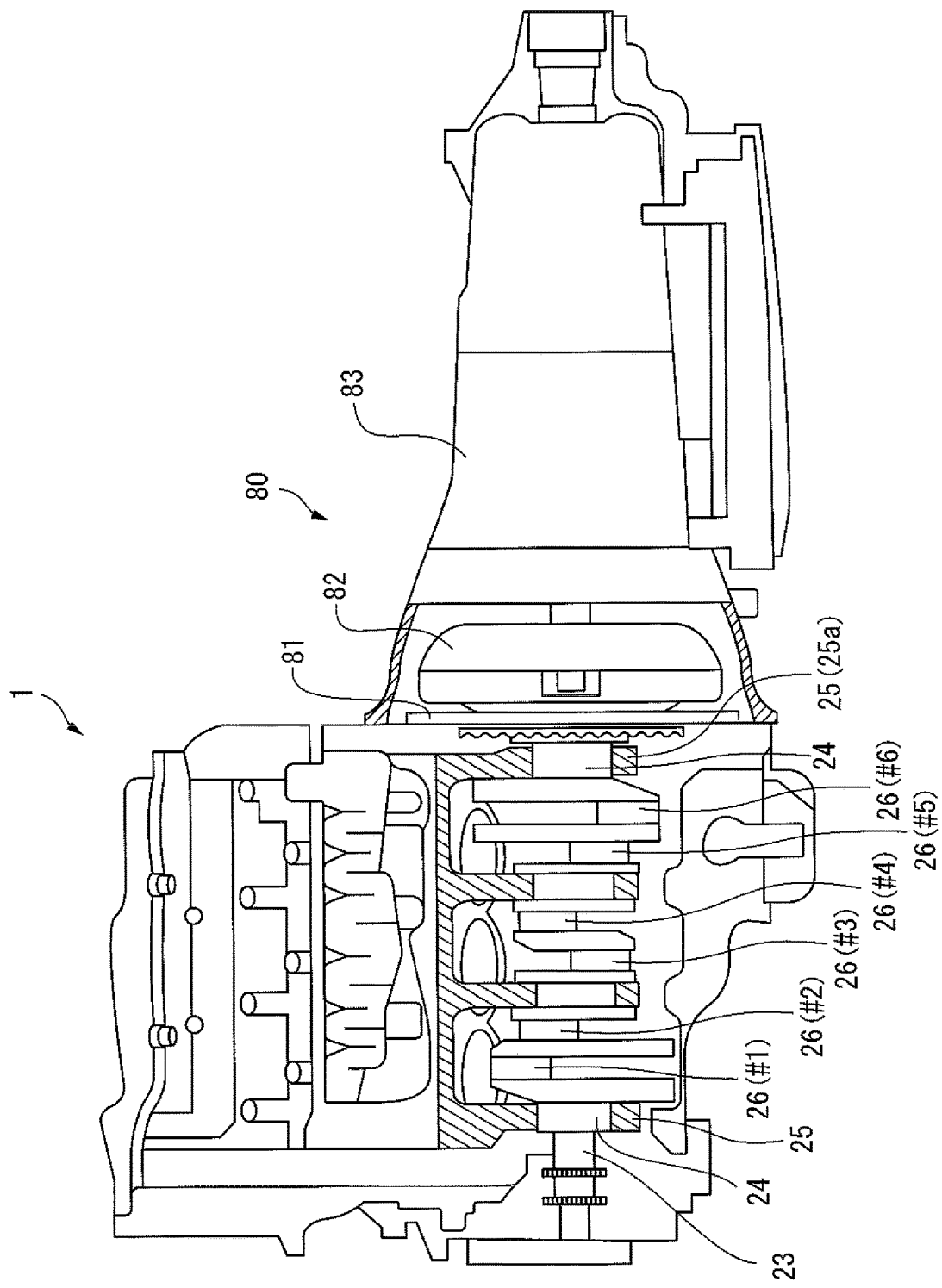
FIG. 3 is a partial cross-sectional side view of an engine body and a transmission arranged adjoining the engine body.

FIG. 3 is a partial cross-sectional side view of the engine body 10 and a transmission arranged adjoining the engine body 10. As shown in FIG. 3, the engine body 10 is provided with a crankshaft 23 extending in the direction of array of the cylinders 13 of the banks 11a, 11b.

The crankshaft 23 is provided with a plurality of crank journals 24. These crank journals 24 are rotatably supported by crank bearings 25 arranged at the cylinder block 11.

Further, the crankshaft 23 is provided with connecting rod journals 26 connected with pistons 14 of the cylinders through connecting rods (not shown). The crankshaft 23 is provided with the same number of connecting rod journals 26 as the number of cylinders 13. The connecting rod journal 26 at one end side of the crankshaft 23 is connected to the piston 14 of the No. 1 cylinder 13#1. On the other hand, the connecting rod journal 26 of the other end side of the crankshaft 23 is connected to the piston 14 of the No. 6 cylinder 13#6. The parentheses in the reference numerals indicating the connecting rod journals 26 in FIG. 3 show the numbers of the cylinders 13 at which are arranged pistons 14 to which the connecting rod journals are connected. Further, the connecting rod journals 26 are configured to have axes off-centered from the axes of the crank journals 24 (axis of crankshaft 23).

At the engine body 10 of the internal combustion engine 1, a transmission 80 is arranged in an adjoining manner. The transmission 80 is arranged adjoining the engine body 10 on the side surface at the side of the No. 5 cylinder 13#5 and the No. 6 cylinder #6. The end part of the crankshaft 23 on the No. 6 cylinder side is connected to the transmission 80 through the flywheel 81. In the illustrated example, the transmission 80 is an automatic transmission provided with a torque converter 82, but may also be a manual transmission or may be a CVT or other automatic transmission. The transmission 80 is fastened by bolts, etc., to the engine body 10.

Mechanism of Generation of Vibrating Noise

In a power train including an internal combustion engine 1 and transmission 80 configured as explained above, an unpleasant rumbling noise and vibration (below, also referred to as the "vibrating noise") occurs, depending on the operating state of the internal combustion engine 1 (for example, at the time of acceleration). The mechanism by which such a vibrating noise is produced is believed to be mainly as follows:

Due to the combustion of the air-fuel mixture at the combustion chambers 15 of the internal combustion engine 1, downward forces are applied through the pistons 14 and connecting rods to the crankshaft 23 (that is, forces in the direction from the combustion chambers 15 toward the crankshaft 23). As a result, a bending stress is applied to the crankshaft 23. If a bending stress is applied to the crankshaft 23, a downward force is applied to the crank bearings 25 supporting the crankshaft 23.

If a downward force is applied to the crank bearings 25a at the transmission side among the plurality of crank bearings 25, the cylinder block 11 deforms at the transmission side. Specifically, the cylinder block 11 deforms so that at the side surface at the transmission 80 side, the upper portion from the crankshaft 23 (cylinder head 12 side) and the lower portion therefrom (oil pan side) separate from each other.

Figure 4:
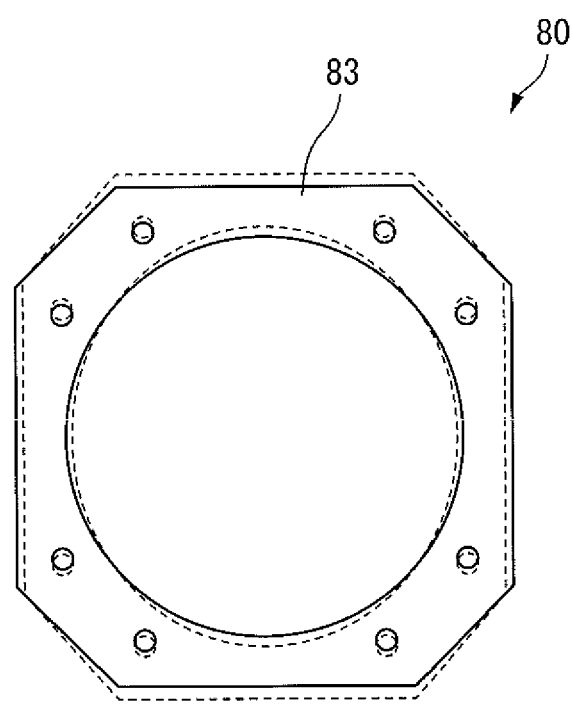
FIG. 4 is a side view of a transmission case.

FIG. 4 is a side view of a case 83 of the transmission 80 (below, also referred to as the "transmission case"). The side surface shown in FIG. 4, among the side surfaces of the transmission 80, is a side surface at the side connected to the cylinder block 11. The state shown in FIG. 4 by the solid lines shows the shape of the transmission case 83 when the cylinder block 11 is not deformed, for example, when the internal combustion engine 1 is stopped.

On the other hand, the broken lines in FIG. 4 show the shape of the transmission case 83 when a vibrating force accompanying combustion of the air-fuel mixture acts on the cylinder block 11 and deforms it. The cylinder block 11, as explained above, deforms so that the upper portion and lower portion from the crankshaft 23 separate from each other. Along with this, the region of the transmission case 83 at the engine body 10 side, which is connected to the cylinder block 11, deforms so as to expand and contract in a vertical direction. By the transmission case 83 vertically expanding and contracting in the region at the engine body 10 side, the above-mentioned rumbling vibrating noise is generated.

Measures Against Vibrating Noise

As explained above, vibrating noise occurs due to the large vibrating force accompanying combustion of the air-fuel mixture at the transmission side cylinders. In other words, if the vibrating force accompanying combustion of the air-fuel mixture at the transmission side cylinders is small, the vibrating noise can be reduced. In the present embodiment, for example, if the vibrating force generated along with combustion of the air-fuel mixture at the No. 5 cylinder 13#5 and No. 6 cylinder 13#6 is made smaller, the vibrating noise can be reduced.

As the method of reducing the vibrating force accompanying combustion at specific cylinders 13, retarding the timings of ignition by the spark plugs 16 at those cylinders compared with other cylinders may be considered. If retarding the ignition timings, the ratio of the heat energy generated along with combustion converted to kinetic energy (rotational energy of the crankshaft 23) becomes lower, and therefore the vibrating force applied to the crankshaft 23 becomes smaller. Therefore, by retarding the ignition timings at the No. 5 cylinder 13#5 and No. 6 cylinder 13#6 from the ignition timings at other cylinders, the vibrating noise can be reduced.

Figure 5:
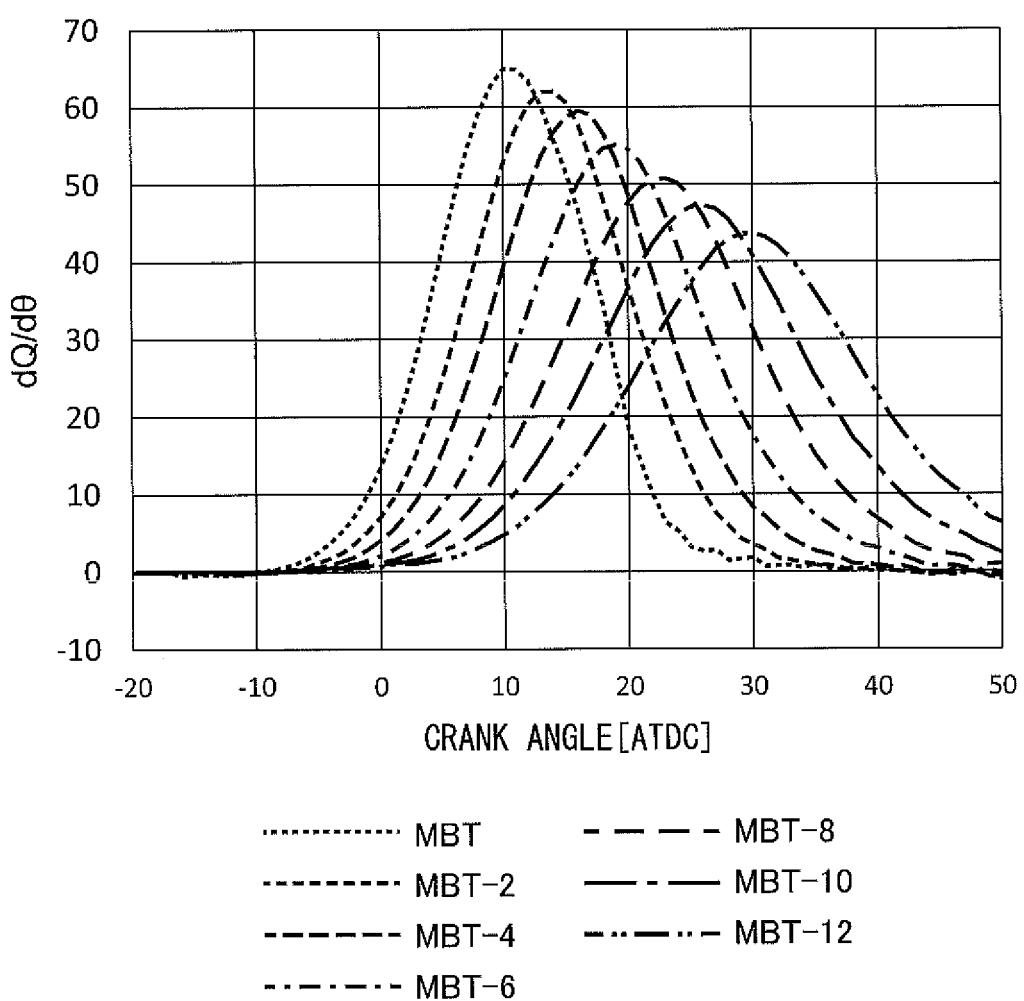
FIG. 5 is a view showing trends in heat generation rates by crank angle.

FIG. 5 is a view showing the trends in the amounts of change of the amounts of heat generated per unit crank angle ($dQ/d\theta$, below, also referred to as the "heat generation rates") with respect to crank angle. The lines in the figure show the trends in the heat generation rates at different ignition timings. The line MBT shows the trend in the heat generation rate in the case where ignition is performed by the spark plug 16 at the MBT, while the line MBT-2 shows the trend in the heat generation rate in the case where ignition is performed at a timing retarded by 2 degrees from MBT. In addition, the line MBT-4 to the line MBT-12 show the trends in the case where ignition is performed at a timing retarded by 4 degrees from MBT to the timing retarded by 12 degrees.

The vibrating force accompanying combustion becomes larger, as the maximum value of the heat generation rate becomes larger. Therefore, the vibrating noise also becomes larger, as the maximum value of the heat generation rate becomes larger. As will be understood from FIG. 5, the more retarded the ignition timing, the smaller the maximum value of the heat generation rate and accordingly the smaller the vibrating noise.

In this regard, however, if retarding the ignition timing, as explained above, the ratio of the heat energy generated along with combustion being converted to kinetic energy becomes lower, and therefore the heat efficiency becomes worse. Therefore, if retarding the ignition timings at the No. 5 cylinder 13#5 and No. 6 cylinder 13#6, the vibrating noise can be reduced, but as a result, the fuel efficiency is deteriorated.

Shapes of Combustion Chambers

Therefore, in the internal combustion engine according to the present embodiment, the combustion chambers 15 are formed so that center heights at the transmission side cylinders positioned the most to the transmission side in the plurality of cylinders 13 is higher than the center heights in usual cylinders including at least one cylinder other than the transmission side cylinders and the peripheral heights at the transmission side cylinders is lower than the peripheral heights at usual cylinders. In this regard, the "center height" means the average value of the height of a combustion chamber 15, at a region inside from a virtual cylindrical surface VC passing through the center of the valve body 21a of the intake valve 21 and extending in the circumferential direction of the cylinder 13, when a piston 14 is at top dead center. Further, the "peripheral height" means the average value of the height of a combustion chamber 15 at a region outside from the virtual cylindrical surface VC, when a piston 14 is at top dead center.

Figure 6:
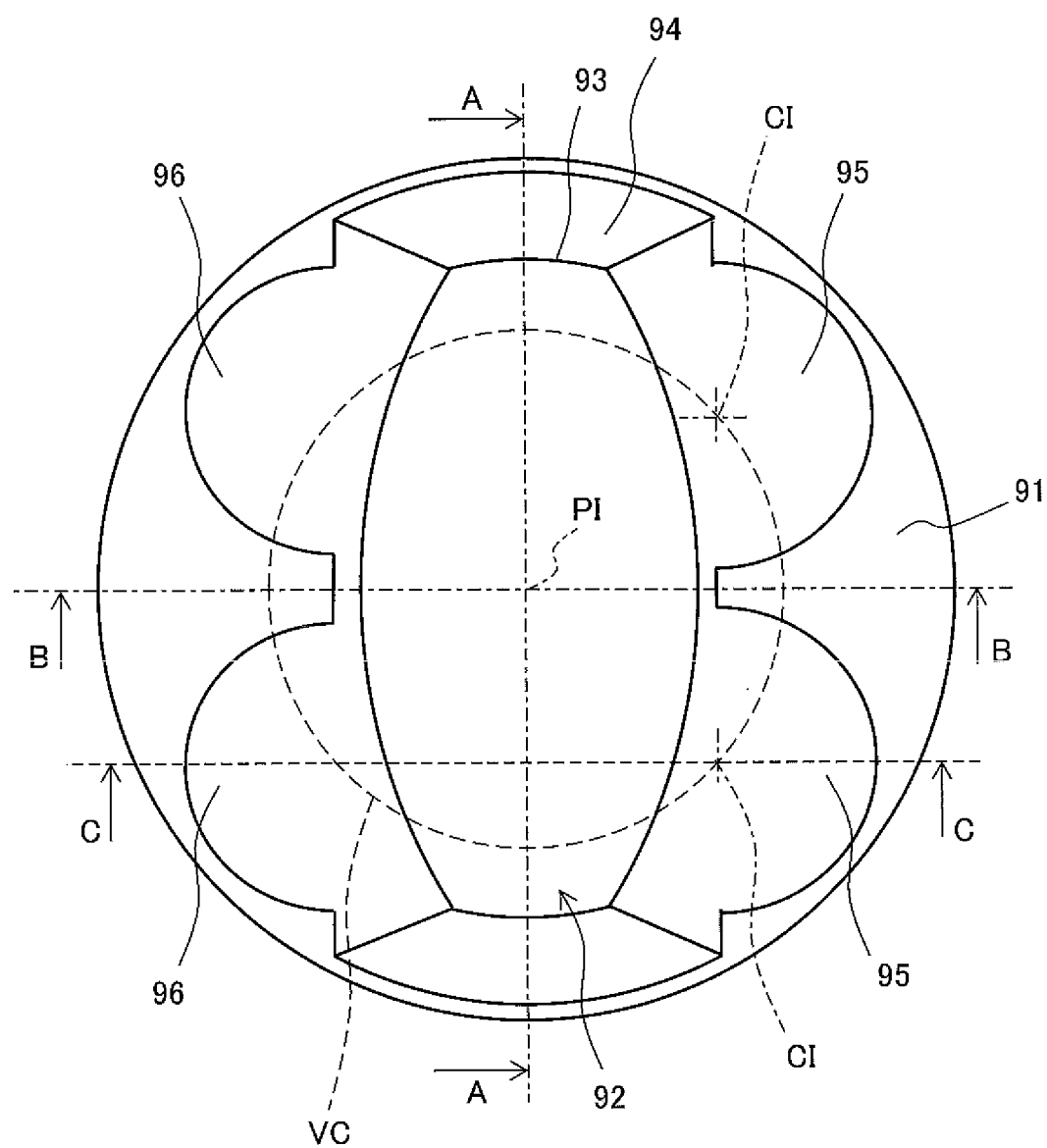
FIG. 6 is a plan view of a piston seen from a combustion chamber side.

FIG. 6 is a plan view of a piston 14 seen from the combustion chamber 15 side. Further, FIGS. 7A to 7C are cross-sectional views of the upper portions of the cylinders 13 (near cylinder head) at the No. 1 cylinder 13#1 to the No. 4 cylinder 13#4 (below, in the present embodiment, also referred to as "usual cylinders"). FIG. 7A is a cross-sectional view at a cross-section passing through an axis XP of the piston 14 and extending in the direction of array of the cylinders 13 of the same bank (below, also referred to as the "array direction cross-section") and a cross-sectional view seen along the line A-A of FIG. 6. FIG. 7B is a cross-sectional view at a cross-section passing through the axis XP of the piston 14 and extending perpendicular to the direction of array of the cylinders 13 (below, also referred to as the "perpendicular direction cross-section") and a cross-sectional view seen along the line B-B of FIG. 6 and the line B-B of FIG. 7A. FIG. 7C is a cross-sectional view at a cross-section passing through the center of the valve body 21a of one intake valve 21 and extending perpendicular to the direction of array of the cylinders 13 and a cross-sectional view seen along the line C-C of FIG. 6 and the line C-C of FIG. 7A.

As will be understood from FIGS. 6 and 7A to 7C, at the top surfaces of the pistons 14 from the No. 1 cylinder 13#1 to the No. 4 cylinder 13#4 (below, also referred to as the "usual pistons"), flat portions 91, center grooves 92, ridge portions 93, slanted portions 94, intake valve recesses 95, and exhaust valve recesses 96 are provided.

A flat portion 91 is formed on the top surface of a piston 14 and extends perpendicularly to the axis XP of the piston 14. The flat portion 91 is provided near the outside circumference of the piston 14.

A center groove 92 is provided at the center of the top surface of a piston 14. As shown in FIGS. 6 and 7A to 7C, the center groove 92 is formed so that the width in the direction of array of the cylinder 13 is larger than the width in the direction perpendicular to the direction of array of the cylinder 13 (below, also referred to as the "array perpendicular direction"). Further, the center groove 92 is formed so as to be deepest at the center of the piston 14 and gradually become shallower as separated further from the center of the piston 14 toward the outsides in the radial direction, if the height downward from the plane at which the flat portion 91 is positioned is defined to as the "depth".

In particular, in the present embodiment, as shown in FIG. 7A, the center groove 92 is formed so that its bottom surface is entirely curved at the array direction cross-section. The center groove 92 may be formed so that its bottom surface is curved by the same radius of curvature over its entirety in the array direction cross-section, or may be formed so that the radius of curvature gradually changes (for example, becomes larger) from the center toward the outsides in the radial direction. However, the center groove 92 may also be formed so that its bottom surface linearly extends from the center to the two edges at the array direction cross-section, or may also be formed so that it is partially curved.

Further, in the present embodiment, the center groove 92 is formed so that its bottom surface extends linearly from the center toward the two edges at the perpendicular direction cross-section. However, the center groove 92 may also be formed so that its bottom surface is entirely or partially curved at the perpendicular direction cross-section.

Ridge portions 93 are provided at the two sides of a center groove 92 in the direction of array of the cylinders 13. The ridge portions 93 are formed so as to protrude upward from the flat portion 91. Therefore, a part of the bottom surface of the center groove 92 is positioned higher than the flat portion 91.

Slanted portions 94 are provided, in the direction of array of the cylinders 13, at the outsides of the ridge portions 93 in the radial direction. The slanted portions 94 are configured to be slanted downward (crankshaft 23 side) from the ridge portions 93 toward the outsides in the radial direction. The slanted portions 94 are formed so that the heights at their outer circumferences is the same heights as the height of the flat portion 91.

An intake valve recess 95 is formed so as to be recessed downward from a flat portion 91. Further, the intake valve recess 95 is formed at a position facing a part of the valve body 21a of the intake valve 21 when the piston 14 is at top dead center. In the present embodiment, two intake valves 21 are provided per cylinder 13, and therefore each piston 14 is provided with two intake valve recesses 95. The intake valve recesses 95 have slanted surfaces extending substantially perpendicularly with respect to the axes XI of the intake valves 21. The slanted surfaces are configured so as to extend up to the edges of the center groove 92 in the array perpendicular direction. Therefore, the intake valve recesses 95 are provided at the top surface of the piston 14 so that the intake valves 21 and piston 14 do not interfere with each other when the piston 14 is at suction top dead center.

An exhaust valve recess 96 is formed so as to be recessed downward from a flat portion 91. Further, the exhaust valve recess 96 is formed at a position facing a part of the valve body 22a of the exhaust valve 22 when the piston 14 is at top dead center. In the present embodiment, two exhaust valves 22 are provided per cylinder 13, and therefore each piston 14 is provided with two exhaust valve recesses 96. The exhaust valve recesses 96 have slanted surfaces extending substantially perpendicularly with respect to the axes XE of the exhaust valves 22. The slanted surfaces are configured so as to extend up to the edges of the center groove 92 in the array perpendicular direction. Therefore, the exhaust valve recesses 96 are provided at the top surface of the piston 14 so that the exhaust valves 22 and piston 14 do not interfere with each other when the piston 14 is at suction top dead center.

Figure 8A:
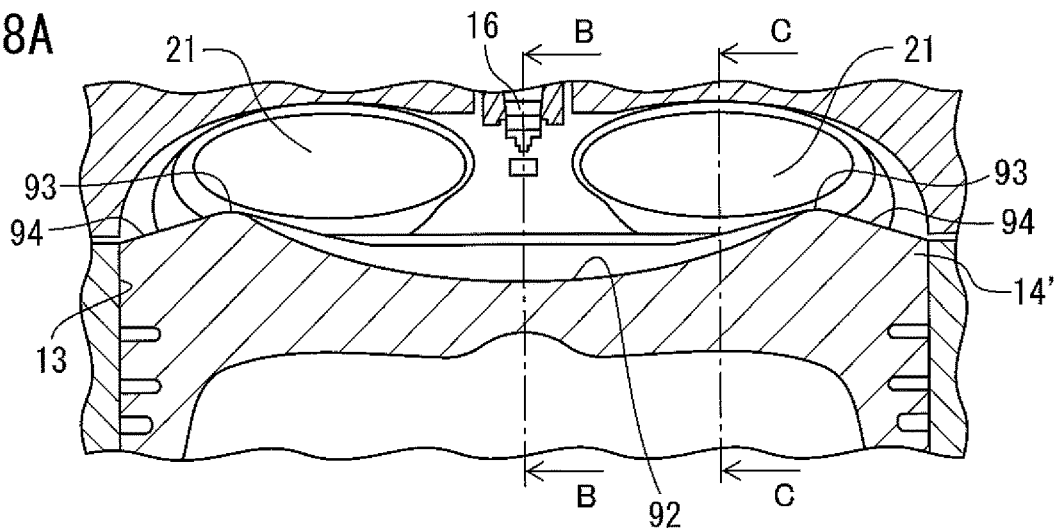
FIGS. 8A-8C are cross-sectional views of a top part of a cylinder (near cylinder head) in a transmission side cylinder.
Figure 8B:
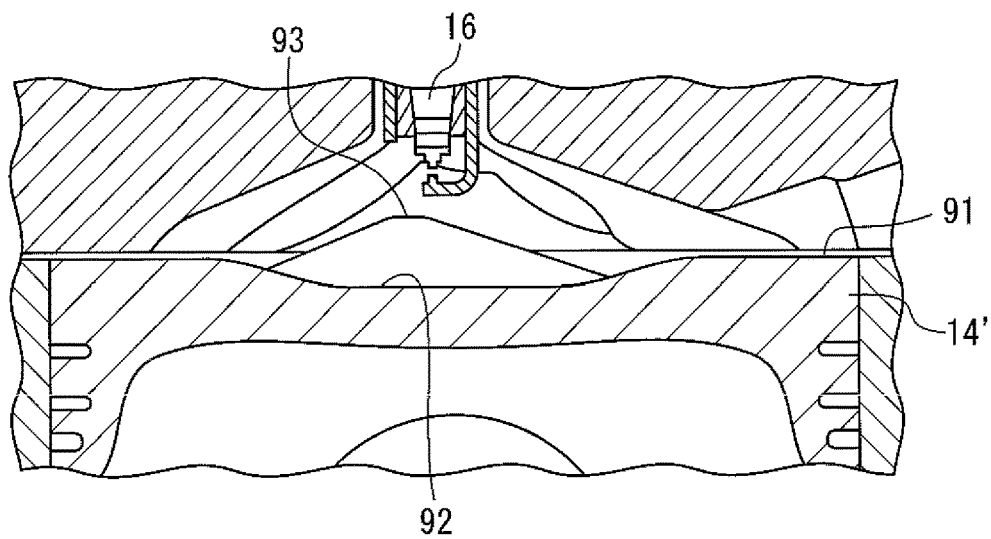
Figure 8C:
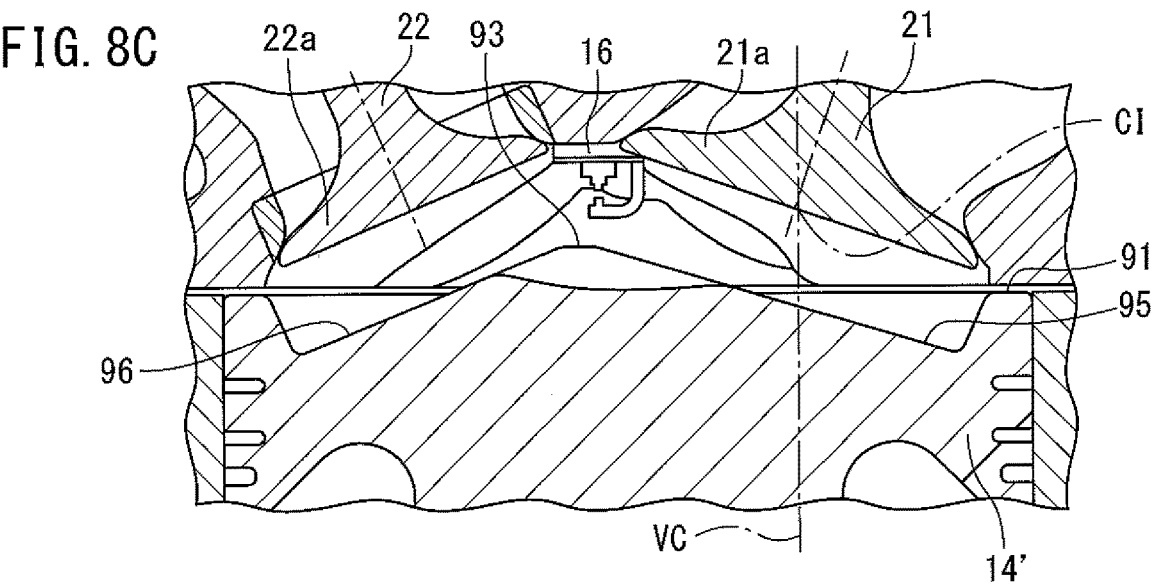

FIGS. 8A to 8C are cross-sectional views of the top portions (near cylinder head) of cylinders 13 at the No. 5 cylinder 13#5 and No. 6 cylinder 13#6 (below, in the present embodiment, also referred to as "transmission side cylinders"). FIG. 8A is a cross-sectional view, similar to FIG. 7A, in the array direction cross-section. FIG. 8B is a cross-sectional view, similar to FIG. 7B, in the perpendicular direction cross-section, and a cross-sectional view seen along the line B-B of FIG. 8A. FIG. 8C is a cross-sectional view, similar to FIG. 7C, in the cross-section passing through the center of the valve body of one intake valve 21 and extending perpendicularly in the direction of array of the cylinders 13, and a cross-sectional view seen along the line C-C of FIG. 8A.

As will be understood from FIGS. 8A to 8C, the pistons 14' of transmission side cylinders (below, also referred to as "transmission side pistons") are also basically formed in the same way as the pistons (usual pistons) 14 of the No. 1 cylinder 13#1 to the No. 4 cylinder 13#4 shown in FIGS. 6 and 7A to 7C. Therefore, at the top surfaces of the transmission side pistons 14', flat portions 91, center grooves 92, ridge portions 93, slanted portions 94, intake valve recesses 95, and exhaust valve recesses 96 are provided.

As shown in FIGS. 8A to 8C, at the transmission side pistons 14' as well, the center grooves 92 are formed so as to be deepest at the centers of the pistons 14 and so as to become gradually shallower as separated further from the centers of the pistons 14 toward the outsides in the radial direction. However, as will be understood if comparing FIGS. 7A to 7C and 8A to 8C, the center grooves 92 of the transmission side pistons 14' are formed so that the depths from the planes at which the flat portions 91 are positioned, is deeper at the centers of the pistons 14 compared with the center grooves 92 of the usual pistons 14. In addition, the center grooves 92 of the transmission side pistons 14' are formed so that the average depths is deeper compared with the center grooves 92 of the usual pistons 14.

Further, at the transmission side pistons 14' as well, the center grooves 92 are formed so as to be entirely curved at the array direction cross-section. The center grooves 92 may be formed to be curved by the same radii of curvature over their entireties in the array direction cross-section, or may be formed so that the radii of curvature gradually change (for example, become larger) from the centers toward the outsides in the radial direction.

Further, at the transmission side pistons 14' as well, ridge portions 93 are provided at the two sides of the center grooves 92 in the direction of array of the cylinders 13. The ridge portions 93 of the transmission side pistons 14' are formed so that the amounts of protrusion upward from the flat portions 91 is larger, compared with the ridge portions 93 of usual pistons 14. In addition, in the present embodiment, the ridge portions 93 of the transmission side pistons 14' are formed so as to be positioned inside in the radial direction, compared with the ridge portions 93 of the usual pistons 14. Therefore, the radii of curvature of the center grooves 92 of the transmission side pistons 14' are on the average smaller than the radii of curvature of the center grooves 92 of the usual pistons 14. In particular, in the present embodiment, the radii of curvature of certain portions of the center grooves 92 of the transmission side pistons 14' are smaller, compared with the radii of curvature of the corresponding portions of the center grooves 92 of the usual pistons 14.

Note that, in the transmission side pistons 14' as well, the center grooves 92 may be formed so that their bottom surfaces extend linearly from the centers toward the two edges in the array direction cross-section, or may be formed so as to be partially curved. In this case, the angles of the slanted surfaces of the center grooves 92 to the planes of the flat portions 91 in the transmission side pistons 14' are larger than the angles of the slanted surfaces of the center grooves 92 to the planes of the flat portions 91 in the usual pistons 14.

The slanted portions 94 of the transmission side pistons 14' are also configured to be slanted downward from the ridge portions 93 to the outsides in the radial direction. In the present embodiment, the slant angles of the ridge portions 93 of the transmission side pistons 14' to the planes at which the flat portions 91 are positioned are larger than the slant angles of the ridge portions 93 of the usual pistons 14.

On the other hand, in the present embodiment, the cylinder head 12 is formed so that the portions positioned so as to cover the cylinders 13 have the same shapes among the cylinders 13. Therefore, both in the transmission side cylinders and in the usual cylinders, the shapes of the portions of the cylinder head 12 defining the combustion chambers 15 are the same. For this reason, in the present embodiment, only the shapes of the top surfaces of the pistons 14 defining the combustion chambers 15 differ between the transmission side cylinders and the usual cylinders.

In this regard, as explained above, the virtual cylindrical surface passing through a center CI of a valve body 21a of an intake valve 21 and extending in the circumferential direction of each cylinder when the piston 14 is at top dead center is defined as the "virtual cylindrical surface VC". In addition, the average of the height (length in top-bottom direction) of a combustion chamber 15 at the insides from the virtual cylindrical surface VC in the radial direction when the piston 14 is at top dead center in the region, is referred to as the "center height" and the average of the height of the combustion chamber 15 in the region at the outsides from the virtual cylindrical surface VC in the radial direction when the piston 14 is at top dead center, is referred to as the "peripheral height". Furthermore, the volume in the combustion chamber 15 in the region at the inside from the virtual cylindrical surface VC in the radial direction when the piston 14 is at top dead center, is referred to as the "center volume" and the volume in the combustion chamber 15 in the region at the outside from the virtual cylindrical surface VC in the radial direction when the piston 14 is at top dead center, is referred to as the "peripheral volume."

In the present embodiment, by the top surfaces of the pistons 14 being configured as explained above, the center heights of the combustion chambers 15 when the pistons 14 are at top dead center are higher at the transmission side cylinders, compared with the usual cylinders. Further, the peripheral heights of the combustion chambers 15 when the pistons 14 are at top dead center are lower at the transmission side cylinders, compared with the usual cylinders.

In addition, the volumes of the combustion chambers 15 when the pistons 14 are at top dead center are substantially the same in all of the cylinders. However, due to the top surfaces of the pistons 14 being configured as explained above, the center volumes at the transmission side cylinders are larger than the center volumes at the usual cylinders. Further, the peripheral volumes at the transmission side cylinders are smaller than the peripheral volumes at the usual cylinders.

Action and Effect

Figure 9A:
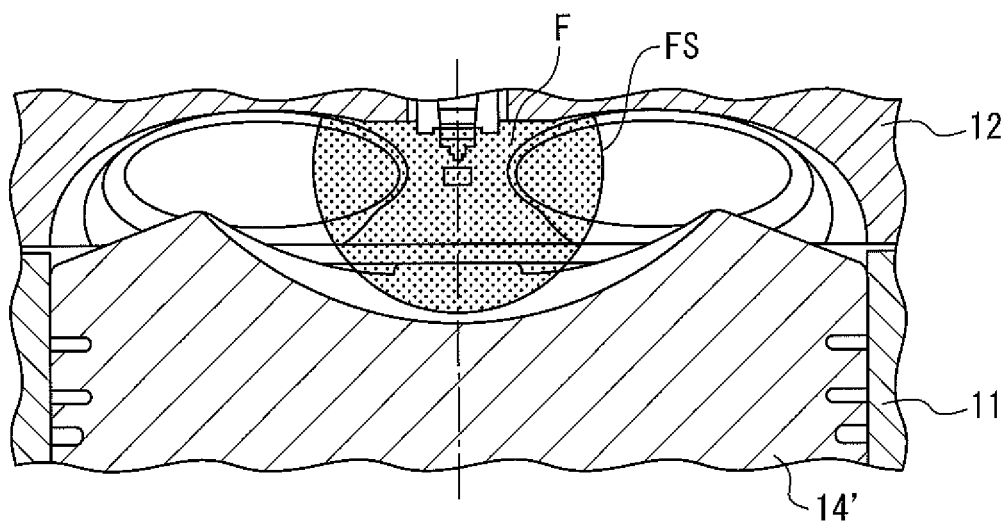
FIGS. 9A and 9B are cross-sectional views schematically showing the state of combustion of an air-fuel mixture in a combustion chamber of a transmission side cylinder.
Figure 9B:
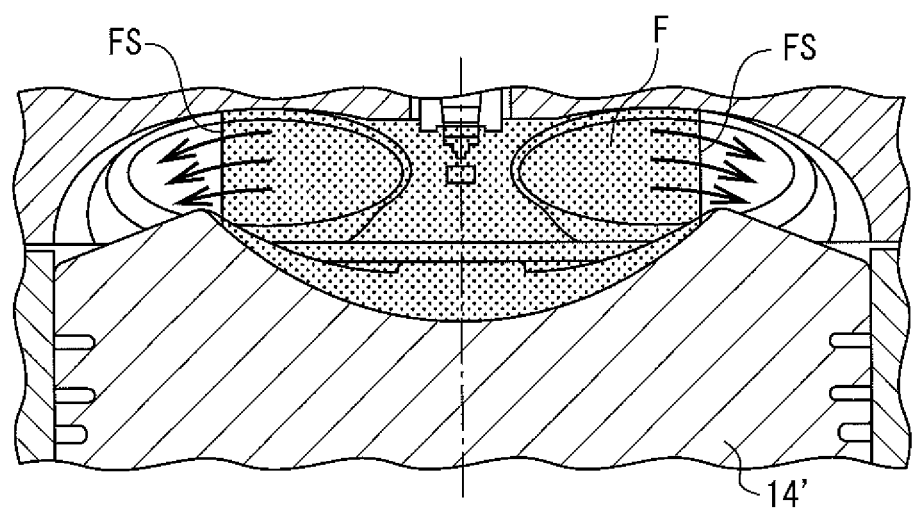
Figure 10:
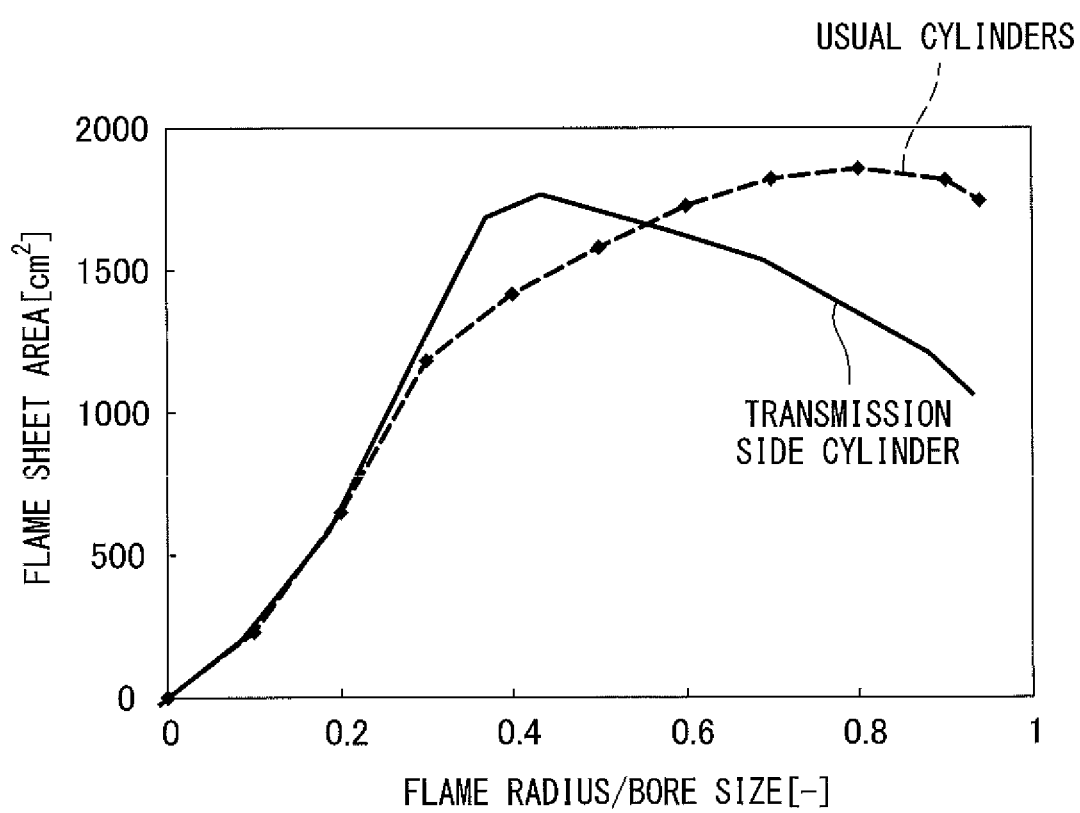
FIG. 10 is a view showing a relationship between a state of spread of a flame and an area of an outer circumferential surface of the flame.
Figure 11:
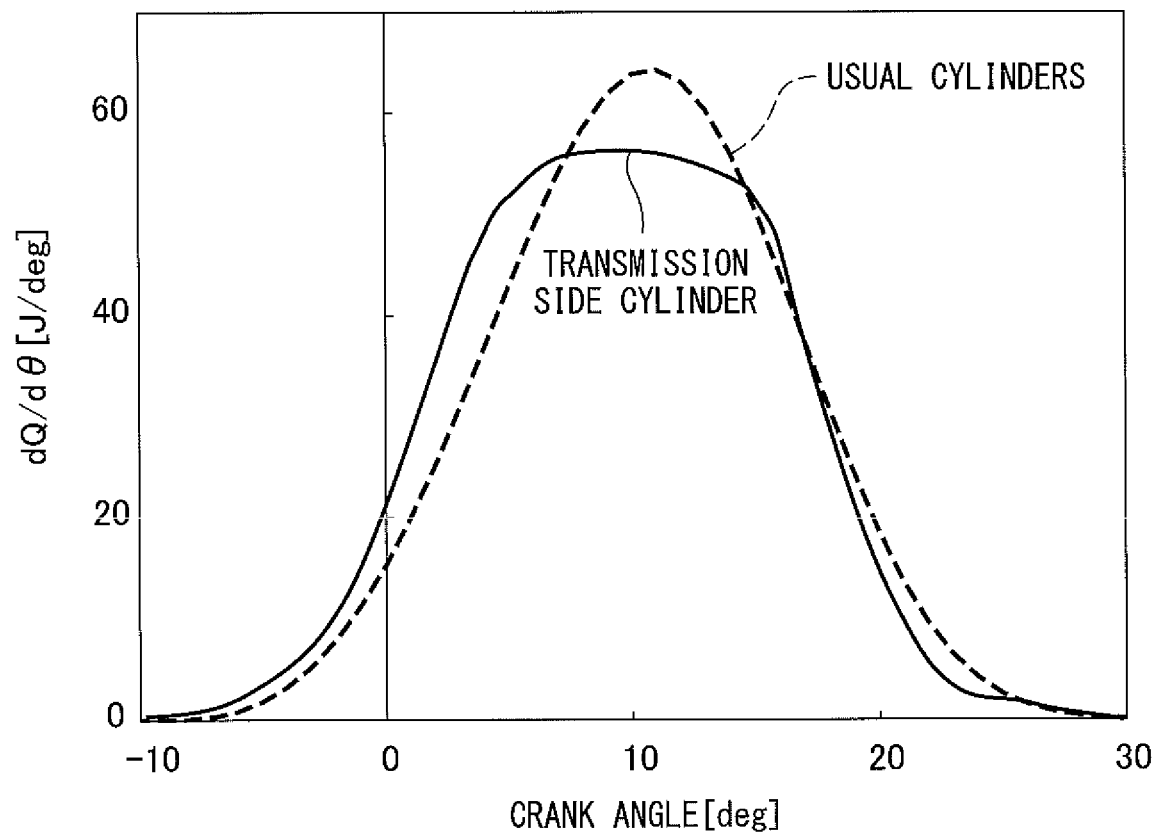
FIG. 11 is a view showing trends in heat generation rates by crank angle.

Next, referring to FIGS. 9A to 11, the action and effect in the internal combustion engine 1 according to the present embodiment will be explained. FIGS. 9A and 9B are cross-sectional views schematically showing the state of combustion of an air-fuel mixture in the combustion chambers 15 of the transmission side cylinders. Further, FIG. 10 is a view showing the relationship between the state of spread of the flame and the area of the flame outer circumferential surface. In addition, FIG. 11 is a view showing the trends in the heat generation rates with respect to crank angle. In FIGS. 10 and 11, the solid lines show the relationships and trends at the transmission side cylinders, while the broken lines show the relationships and trends at the usual cylinders.

FIG. 9A shows the state in the combustion chambers 15 right after ignition of the air-fuel mixture by the spark plugs 16. As shown in FIG. 9A, right after ignition of the air-fuel mixture, the flame F generated by the ignition spreads concentrically. In particular, at the transmission side cylinders, the center grooves 92 of the pistons 14 are deep and the heights of the combustion chambers 15 in the virtual cylindrical surface VC are high, and therefore the sheet FS of the flame F (spreading outer circumferential surface of flame) can be delayed from contacting the wall surfaces of the pistons 14. For this reason, as shown in FIG. 10, in the region of a ratio of the flame radius to the bore size of 0.2 to 0.5, the area of the flame sheet FS is larger at the transmission side cylinders, compared with the usual cylinders. As a result, as shown in FIG. 11, the maximum speed of rise of the heat generation rate ($dQ/d\theta$) in the region of the crank angle of 0 to 5 degrees or so where the heat generation rate rises, is faster in the transmission side cylinders than in the usual cylinders.

FIG. 9B shows the state in the combustion chambers 15 after combustion of the air-fuel mixture in the combustion chambers 15 progresses by a certain extent. The bottom surface of the flame contacts the top surfaces of the pistons 14 (top surfaces of center grooves 92), and therefore the sheet of the flame FS, as shown by the arrow in the figure, advances in the radial directions of the combustion chambers 15. In this regard, as explained above, at the transmission side cylinders, the heights of the combustion chambers 15 are low at the region outside from the virtual cylindrical surface VC. For this reason, as will be understood from FIG. 9B, if the combustion of the air-fuel mixture proceeds by a certain extent, compared with the usual cylinders, the transmission side cylinders are smaller in area of the flame sheet FS. This will be understood from the fact that at FIG. 10, in the region where the ratio of the flame radius to the bore size is equal to or greater than 0.6, compared with the usual cylinders, the transmission side cylinders are smaller in area of the flame sheet FS.

In particular, the flame sheet FS at the time when the heat generation rate peaks usually reaches the outside from the virtual cylindrical surface VC. Therefore, at the transmission side cylinders, around the time when the heat generation rate peaks, the heights of the combustion chambers 15 are low and accordingly the area of the flame sheet FS is small. As a result, as shown in FIG. 11, near the region where the heat generation rate peaks, at the transmission side cylinders, the heat generation rates do not rise much at all and as a result the maximum value of the heat generation rates at the transmission side cylinders is lower than the maximum value of the heat generation rates at the usual cylinders.

As explained above, the vibrating force accompanying combustion is larger as the maximum value of the heat generation rates is larger. In the present embodiment, it is possible to lower the maximum value of the heat generation rates at the transmission side cylinders, and therefore it is possible to reduce the vibrating force accompanying combustion at the transmission side cylinders and as a result possible to reduce the vibrating noise.

Further, as will be understood from FIG. 11, at the transmission side cylinders, the maximum value of the heat generation rates is lower compared with the usual cylinders, but the time periods during which the heat generation rates is large are similar between the transmission side cylinders and usual cylinders. For this reason, the time periods during which the heat generation rates is large do not shift overall to the retarded side, differently from when retarding the ignition timings, and accordingly the heat efficiency does not change much between the transmission side cylinders and usual cylinders. Therefore, in the present embodiment, the fuel efficiency is kept from deteriorating like when retarding the ignition timings. Due to the above, according to the present embodiment, it is possible to keep the fuel efficiency from deteriorating and reduce the vibrating noise generated during operation of the internal combustion engine.

Modifications

In the above embodiment, the combustion chambers 15 of the two cylinders 13 of the No. 5 cylinder 13#5 and the No. 6 cylinder 13#6 are formed to the same shapes with relatively high center heights and with relatively low peripheral heights, while the combustion chambers 15 of the other cylinders are formed to the same shapes with relatively low center heights and with relatively high peripheral heights.

However, only the combustion chamber 15 of the No. 6 cylinder 13#6, as a transmission side cylinder, may be formed with a relatively high center height and a relatively low peripheral height, and the combustion chambers 15 of the other cylinders, as normal cylinders, may be formed to the same shapes with relatively low center heights and relatively high peripheral heights. Alternatively, the combustion chambers 15 of the three cylinders 13 of the No. 4 cylinder 13#4 to the No. 6 cylinder 13#6, as transmission side cylinders, may be formed to the same shapes with relatively high center heights and relatively low peripheral heights and the combustion chambers 15 of the other cylinders may be formed to the same shapes with relatively low center heights and relatively high peripheral heights.

Further, in the above embodiment, the internal combustion engine 1 is a six-cylinder V-engine, but as explained above, the internal combustion engine 1 may also be an inline type or horizontally opposed type internal combustion engine, or may be an internal combustion engine with a number of cylinders other than six cylinders such as three cylinders, four cylinders, eight cylinders, and 10 cylinders. For example, in a four-cylinder inline internal combustion engine, the combustion chamber 15 of the No. 4 cylinder 13#4 which is positioned the most at the transmission side, as a transmission side cylinder, is formed with a relatively high center height and relatively low peripheral height, while the combustion chambers 15 of the other cylinders, as usual cylinders, are formed to the same shapes with relatively low center heights and relatively high peripheral heights. Alternatively, the combustion chambers 15 of the transmission side No. 3 cylinder 13#3 and No. 4 cylinder #4, as transmission side cylinders, may be formed to the same shape with relatively high center heights and relatively low peripheral heights, while the combustion chambers 15 of the other cylinders, as usual cylinders, may be formed to the same shape with relatively low center heights and relatively high peripheral heights.

Whatever the case, the internal combustion engine 1 may be formed in any way so long as the combustion chamber 15 of the transmission side cylinder positioned the most to the transmission side in the plurality of cylinders are formed with relatively high center height and relatively low peripheral height and so long as the combustion chambers 15 of the usual cylinders including the cylinder positioned the furthest from the transmission side in the plurality of cylinders have relatively low center heights and relatively high peripheral heights.

Further, in the above embodiment, the center heights and peripheral heights change in two stages (two stages of No. 1 cylinder 13#1 to No. 4 cylinder 13#4, and No. 5 cylinder 13#5 to No. 6 cylinder 13#6). However, the center heights and peripheral heights may also be formed to change in multiple stages. For example, the combustion chambers 15 of the third cylinder 13#3 and the No. 4 cylinder 13#4 may be formed to be lower in center heights and higher in peripheral heights compared with the combustion chambers 15 of the No. 5 cylinder 13#5 and No. 6 cylinder 13#6 and the combustion chambers 15 of the No. 1 cylinder 13#1 and the No. 2 cylinder 13#2 may be formed to be lower in center heights and higher in peripheral heights compared to the combustion chambers 15 of the third cylinder 13#3 and the No. 4 cylinder 13#4.

Alternatively, the center heights and peripheral heights may also be formed to be different from each other at the combustion chambers 15 of all of the cylinders 13. In this case, the combustion chambers 15 are formed so that the center height of the combustion chamber 15 at the transmission side cylinder of two adjoining cylinders is higher than the center height of the combustion chamber 15 of the cylinder 13 at the opposite side from the transmission side and so that the peripheral height of the combustion chamber 15 at the transmission side cylinder of two adjoining cylinders, is lower than the peripheral height of the combustion chamber 15 of the cylinder 13 at the opposite side from the transmission side.

Whatever the case, the combustion chambers 15 may be formed in any way so long as the center height of the combustion chamber 15 at the transmission side cylinder of two adjoining cylinders is equal to or greater than the center height of the combustion chamber 15 of the cylinder 13 at the opposite side from the transmission side, and so that the peripheral height of the combustion chamber 15 at the transmission side cylinder of two adjoining cylinders, is equal to or less than the peripheral height of the combustion chamber 15 of the cylinder 13 at the opposite side from the transmission side.

Further, in the above embodiment, the cylinder head 12 is formed so that the parts positioned so as to cover the cylinders 13 have substantially the same shapes among the cylinders 13. However, if the combustion chambers 15 of the transmission side cylinders positioned the most to the transmission side among the plurality of cylinders are formed with relatively high center heights and relatively low peripheral heights and the combustion chambers 15 of the usual cylinders including the cylinders positioned separated the most from the transmission in the plurality of cylinders are formed with relatively low center heights and relatively high peripheral heights, the cylinder head 12 may be formed to be different in shapes among the cylinders 13.

In addition, in the above embodiment, a transmission 80 is arranged adjoining the engine body 10 of the internal combustion engine 1. However, instead of the transmission 80, a power train component different from the transmission 80 forming part of the power train of the vehicle, which mounts the internal combustion engine 1, may also be arranged adjoining the engine body 10. In this case, the power train component is preferably housed in a case like the transmission case. Further, such a power train component includes, for example, a motor, generator, motor-generator, power dividing mechanism of a hybrid vehicle, speed reducer, etc. If summarizing these, the internal combustion engine 1 can be said to be an internal combustion engine in which power train components other than the internal combustion engine 1 are arranged adjoining it.

The invention claimed is:

1. An internal combustion engine comprising:
   a plurality of cylinders and with a power train component other than the internal combustion engine arranged adjoining the internal combustion engine, wherein
   center height is an average of a height of a combustion chamber in a region inside from a virtual cylindrical surface passing through a center of a valve body of an intake valve and extending in a circumferential direction of each cylinder when a piston is at top dead center,
   peripheral height is an average of a height of the combustion chamber in a region outside from the virtual cylindrical surface when the piston is at top dead center, and
   the combustion chambers are formed so that a center height of a component side cylinder positioned closest to the power train component side among the plurality of cylinders is higher than center heights of usual cylinders including at least one cylinder other than the component side cylinder and a peripheral height at the component side cylinder is lower than peripheral heights of the usual cylinders.

2. The internal combustion engine according to claim 1, wherein the usual cylinders include a cylinder positioned separated the most from the power train component.

3. The internal combustion engine according to claim 2, wherein the combustion chambers are formed so that the center height at the cylinder at the power train component side of two adjoining cylinders, is equal to or greater than the center height at the cylinder at the opposite side from the power train component side, and so that the peripheral height at the cylinder of the power train component side of two adjoining cylinders, is equal to or less than the peripheral height at the cylinder at the opposite side from the power train component side.

4. The internal combustion engine according to claim 1, wherein
   the combustion chamber is at least partially defined by a cylinder head and the piston, and
   a shape of a part of the cylinder head defining each combustion chamber is the same regardless of the center height and the peripheral height, and the shape of the piston defining each combustion chamber is a shape differing according to the center height and the peripheral height.

5. The internal combustion engine according to claim 4, wherein
   the piston comprises a groove at a center part of its top surface in a cross-section passing through a center of the piston and extending in a direction in which the plurality of cylinders are arranged, and
   the piston is formed so that an average depth of the groove of the piston is deeper in a cylinder with a relatively high center height compared with a cylinder with a relatively low center height.

6. The internal combustion engine according to claim 5, wherein the groove of the piston is formed to be deepest at the center of the piston and to become gradually shallower toward the outside of the piston in the radial direction, and is formed so that the depth of the groove at the center of the piston is deeper in a cylinder with a relatively high center height compared with a cylinder with a relatively low center height.

7. The internal combustion engine according to claim 5, wherein the piston comprises slanted portions with top surfaces slanting to the crankshaft side toward the outsides in the radial direction at the outside of the groove.

* * * * *